US012804695B2

(12) United States Patent
Harrington et al.

(10) Patent No.: US 12,804,695 B2
(45) Date of Patent: Nov. 17, 2026

(54) WI-FI FREQUENCY HOPPING VSAT

(71) Applicant: Hughes Network Systems, LLC, Germantown, MD (US)

(72) Inventors: Emanuel Harrington, Bowie, MD (US); Ryan Mirsafaei, Gaithersburg, MD (US); Josh Dalton, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 403 days.

(21) Appl. No.: 18/621,876

(22) Filed: Mar. 29, 2024

(65) Prior Publication Data

US 2025/0310981 A1 Oct. 2, 2025

(51) Int. Cl.

| | |
|---|---|
| ***H04W 72/541*** | (2023.01) |
| ***H04B 1/715*** | (2011.01) |
| ***H04L 5/00*** | (2006.01) |
| ***H04W 72/542*** | (2023.01) |
| ***H04W 84/12*** | (2009.01) |
| ***H04W 88/10*** | (2009.01) |

(52) U.S. Cl.

CPC .......... *H04W 72/541* (2023.01); *H04B 1/715* (2013.01); *H04L 5/0037* (2013.01); *H04W 72/542* (2023.01); *H04B 2001/7154* (2013.01); *H04W 84/12* (2013.01); *H04W 88/10* (2013.01)

(58) Field of Classification Search

CPC . H04W 72/541; H04W 72/542; H04W 84/12; H04W 88/10; H04B 1/715; H04L 5/0037

See application file for complete search history.

(56) References Cited

U.S. PATENT DOCUMENTS

| | | | | |
|---|---|---|---|---|
| 11,943,644 | B2 * | 3/2024 | Bhagavatula | H04L 43/10 |
| 2008/0075033 | A1 * | 3/2008 | Shattil | H04L 5/0007 370/328 |
| 2013/0023214 | A1 * | 1/2013 | Wang | A61B 5/0002 455/41.2 |
| 2014/0341108 | A1 * | 11/2014 | Desai | H04L 5/0073 370/328 |
| 2016/0014793 | A1 * | 1/2016 | Klemp | H04B 1/3822 370/329 |
| 2017/0279506 | A1 * | 9/2017 | Shattil | H04L 5/0007 |
| 2018/0103401 | A1 * | 4/2018 | Ponnuswamy | H04L 43/16 |

(Continued)

*Primary Examiner* — Redentor Pasia

(74) *Attorney, Agent, or Firm* — Kilpatrick Townsend & Stockton LLP

(57) ABSTRACT

Techniques are described herein for using intelligent frequency hopping to mitigate channel degradation in a WiFi router caused by interference from proximate radiofrequency transceiver devices, such as cellular boosters. Embodiments can periodically compute channel qualities of presently active channels to which user equipment is presently assigned in a wireless local area network (WLAN) based on the channel map. The channel qualities can be used to detect a degraded one of the active channels as experiencing channel degrading interference from a proximate radiofrequency transceiver device. Channel qualities can also be computed for some or all presently idle channels of the WiFi router to identify a new channel as having improved channel quality relative to the degraded channel. Embodiments can update the channel map by reassigning user equipment from the degraded channel to the new channel.

20 Claims, 6 Drawing Sheets

(56) References Cited

U.S. PATENT DOCUMENTS

| | | | | |
|---|---|---|---|---|
| 2019/0273556 | A1* | 9/2019 | Regunathan | H04W 28/04 |
| 2020/0099443 | A1* | 3/2020 | Ravishankar | H04W 74/02 |
| 2021/0092640 | A1* | 3/2021 | Ravishankar | H04L 47/6275 |
| 2022/0007366 | A1* | 1/2022 | Panje | H04W 16/04 |
| 2022/0417817 | A1* | 12/2022 | Wang | H04W 36/0058 |

* cited by examiner

WI-FI FREQUENCY HOPPING VSAT

BACKGROUND

Customers often access wireless communication services from their customer premises, such as their home or office, via a wireless local area network (WLAN). The WLAN is typically established by a local router (e.g., a WiFi router), which is coupled with a provider network. For example, the router can be coupled with terrestrial (Ethernet, fiberoptic, etc.) infrastructure of a cable communication network via a cable modem, the router can be coupled with a satellite communication network via a satellite modem, etc.

In some cases, a very small aperture terminal (VSAT) is used as a bridge between a satellite provider network and a customer premises network. For example, the VSAT includes a satellite antenna and a satellite modem, and some VSATs additionally include a WiFi router to establish the WLAN. In some cases, other devices in the customer premises transmit over a large range of frequencies. For example, a customer may have a cellular booster to improve cellular coverage within the customer premises. Depending on the transmit frequencies, transmit powers, relative proximities, and other properties of such devices, operation of these devices can cause interference with a concurrently operating WiFi router, which can degrade performance.

SUMMARY

Systems and methods are described herein for using intelligent frequency hopping to mitigate channel degradation in a WiFi router caused by interference from proximate radiofrequency transceiver devices, such as cellular boosters. Embodiments can periodically compute channel qualities of presently active channels to which user equipment is presently assigned in a wireless local area network (WLAN) based on the channel map. The channel qualities can be used to detect a degraded one of the active channels as experiencing channel degrading interference from a proximate radiofrequency transceiver device. Channel qualities can also be computed for some or all presently idle channels of the WiFi router to identify a new channel as having improved channel quality relative to the degraded channel. Embodiments can update the channel map by reassigning user equipment from the degraded channel to the new channel.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
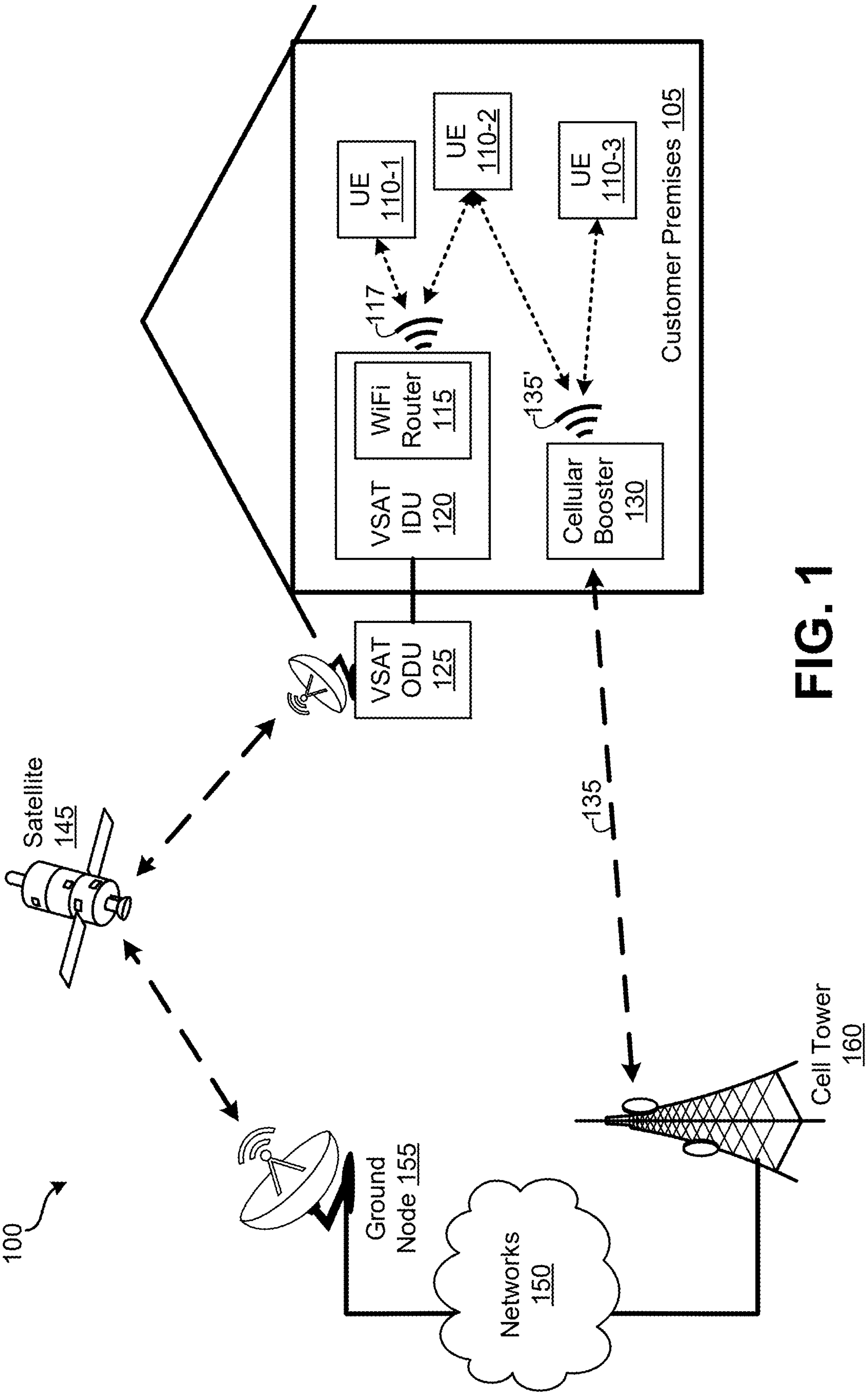
FIG. 1 shows an example of a communication system as context for embodiments described herein.

FIG. 1 shows an example of a communication system 100 as context for embodiments described herein. It is assumed for embodiments described herein that users of the communication system 100 interact with communication services via user equipment (UE) 110 located in customer premises 105. To avoid overcomplicating the figure, only a single customer premises 105 and only three UEs 110 are shown. When inside the customer premises 105, the UEs 110 can engage with communication services via one or more networks. For example, UE 110-1 and UE 110-2 both have wireless fidelity (WiFi) capability for engaging with a wireless local area network (WLAN) 117 provided by a WiFi router 115. Additionally, UE 110-2 and UE 110-3 have cellular capability for engaging with a cellular network 135.

As illustrated, WLAN 117 communication services are provided by a satellite communication network including ground nodes 155 (e.g., satellite gateways), a satellite 145, and a very small aperture terminal (VSAT) at the customer premises 105. The ground node 155 can be in communication with one or more other networks 150, such as one or more provider networks, the Internet, public and/or private networks, backhaul networks, etc. Although only a single ground node 155 and satellite 145 are shown, the satellite communication network can include any suitable number of ground nodes 155 and satellites 145. The VSAT includes a VSAT indoor unit (IDU) 120 inside the customer premises 105 and a VSAT outdoor unit (ODU) 125 outside the customer premises 105. For example, the VSAT ODU 125 can be located next to the customer premises 105, mounted to the exterior of the customer premises 105, etc. As described below, the VSAT IDU 120 and the VSAT ODU 125 are communicatively coupled with each other. The WiFi router 115 can be implemented as part of the VSAT IDU 120, such that the WLAN 117 is essentially a local extension of the satellite communication network.

The WiFi router 115 is essentially a local radiofrequency (RF) transceiver device. Embodiments herein assume that the customer premises 105 includes one or more additional RF transceiver devices. In the illustrated embodiment, an additional RF transceiver device is illustrated as a cellular booster 130. As shown, the cellular booster 130 receives cellular network 135 signals from one or more cell towers 160 (only one is shown for simplicity). The cell towers 160 can be in communication with any feasible networks 150, such as one or more provider networks, the Internet, public and/or private networks, backhaul networks, etc. The cell towers 160 and satellite ground nodes 155 may be in communication with different networks 150, or they may communicate with a partially or fully overlapping set of networks 150. For example, the satellite network may be in communication with a satellite provider network infrastructure, and the cellular network may be in communication with a cellular network provider infrastructure; but both may be in communication with the Internet backbone via their respective infrastructures.

In general, a cellular booster 130 is a device that boost receives the cellular network 135 signal and outputs a boosted cellular network signal 135'. Different types of cellular boosters 130 can be used to amplify different types of cellular signals (e.g., 3G, 4G, 5G, etc.) to satisfy different parameter. Some are analog signal boosters (e.g., wideband boosters) that typically amplify all frequencies from carrier operators. Others are smart signal boosters, which typically use digital technology to amplify cellular signals. Some cellular boosters 130 are carrier-specific (i.e., tailored for amplifying signals from a particular cellular carrier) and others are carrier-agnostic. Different cellular boosters 130 can operate at different power levels, can amplify different frequency bands, and can include different internal circuits and components.

Figure 2:
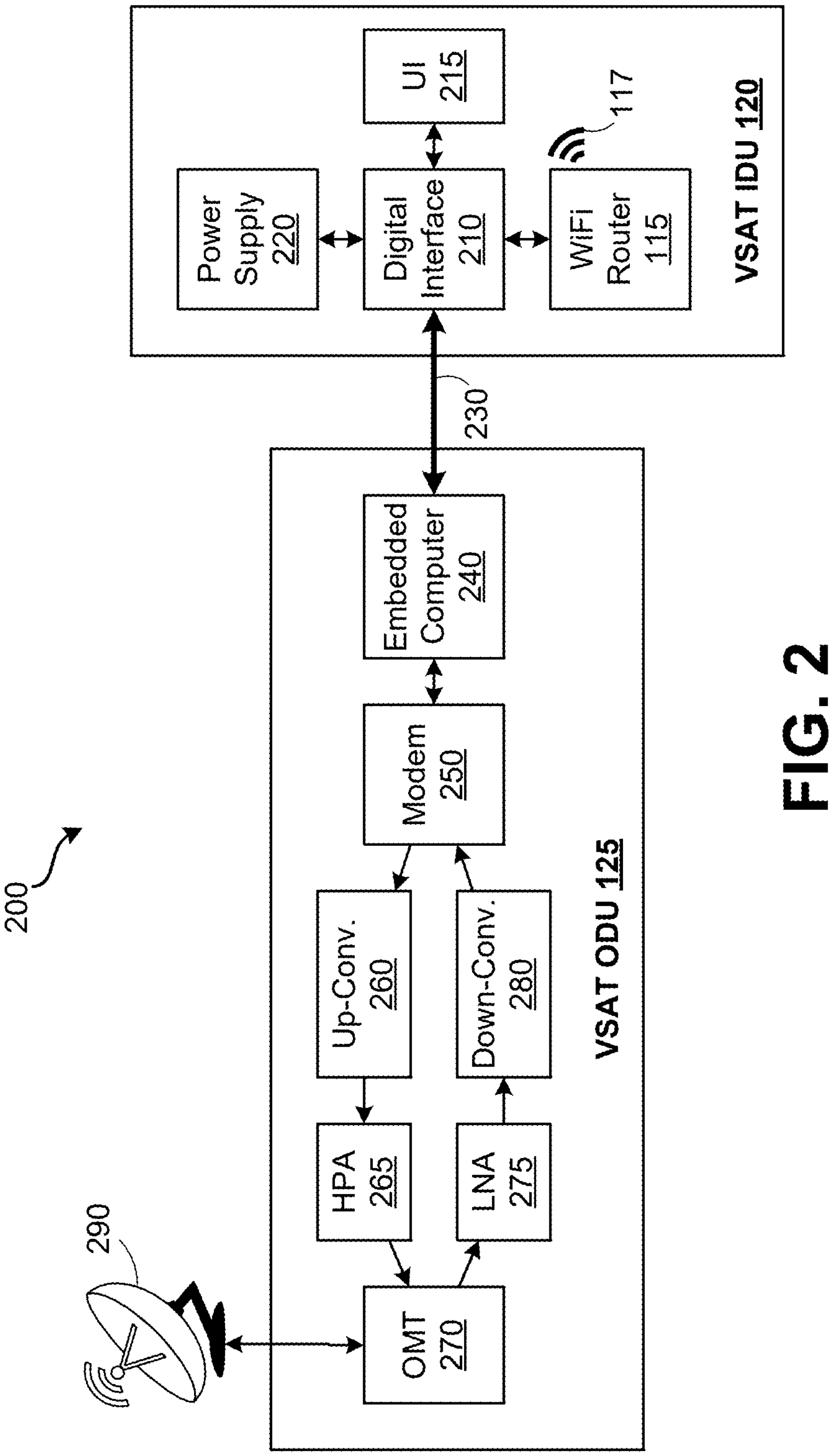
FIG. 2 shows a block diagram of an illustrative very small aperture terminal (VSAT), according to embodiments described herein.

FIG. 2 shows a block diagram of an illustrative very small aperture terminal (VSAT) 200, according to embodiments described herein. The VSAT 200 includes a VSAT IDU 120 and a VSAT ODU 125, which can be implementations of the VSAT IDU 120 and the VSAT ODU 125 of FIG. 1. The VSAT 200 is essentially a small earth station for receiving and transmitting data via satellites. VSATs 200 can be particularly valuable in remote or underserved locations where traditional wired connectivity is either impractical or unavailable, facilitating provision of communication services, such as providing broadband internet, Voice over IP (VoIP), and data communications services.

Typically, a VSAT 200 can be installed at a customer premises by positioning its antenna 290 in a location with an unobstructed view of the satellite to ensure optimal signal reception and transmission. The antenna 290 is often a parabolic reflector dish ranging from approximately 0.75 to 1.2 meters in diameter. In general, functions of the VSAT 200 are distributed between the VSAT IDU 120 and the VSAT ODU 125, and those units are in communication with each other via an interconnect 230 (e.g., one or more coaxial, Ethernet, or fiber optic cables). Each of the VSAT IDU 120 and the VSAT ODU 125 can include its own housing. Different implementations of VSATs 200 can include different functions and can implement functions in different ways. For example, although FIG. 2 shows an example set of component blocks, other implementations can include more, fewer, and/or different component blocks. Similarly, although FIG. 2 shows an example allocation of component blocks between the VSAT IDU 120 and the VSAT ODU 125, other implementations can allocate component blocks differently.

In the illustrated implementation, the VSAT ODU 125 includes an orthomode transducer (OMT) 270, a high-power amplifier (HPA) 265, a low-noise amplifier (LNA) 275, an upconverter 260, a down-converter 280, a modem 250, and an embedded computer 240. The OMT 270 can separate or combine orthogonally polarized signals to prevent mutual interference. For example, embodiments use right-hand circular polarization and left-hand circular polarization orientations. In a receive path, signals from the OMT 270 are passed to the LNA 275 to amplify the incoming signals with minimal noise addition to enhance reception quality. Those signals can then be passed to the down-converter 280, which can transform high-frequency inbound signals to a lower frequency that the modem 250 can process. The down-converted signals can then be passed to the modem 250. In a transmit path, signals from the modem 250 can be passed to the upconverter 260, which can shift the lower frequency (e.g., baseband or intermediate frequency) signal to a higher frequency that is suitable for satellite transmission. The up-converted signal can then be passed to the HPA 265, which can boost the strength of signals being sent to a satellite via the antenna 290 to enhance transmission quality. Embodiments of the modem 250 (modulator/demodulator) modulate outbound signals for transmission and demodulate inbound signals into a format that can be digitally handled. In some embodiments, an embedded computer 240 is coupled with the modem 250. For example, the embedded computer 240 orchestrates operation of the VSAT ODU 125 components, such as by helping to manage signal processing, to maintain the integrity of the satellite communication link, and to interface with the IDU.

The transmit and/or receive paths of the VSAT ODU 125 can include additional and/or different components. For example, instead of the OMT 270, implementations can include separate transmit and receive polarization orientation control. Additionally or alternatively, implementations of the VSAT ODU 125 can include a multiplexer/de-multiplexer (MUX/De-MUX), which combines multiple input streams into a single output stream over the uplink and separates incoming streams from the downlink into individual outputs. Additionally or alternatively, implementations can include an encryption/decryption block to help ensure the security of transmitted and received data.

In the illustrated implementation, the VSAT IDU 120 includes a digital Interface 210, a power supply unit 220, a user interface (UI) 215, and a WiFi router 115. The digital interface 210 is in communication with the embedded computer 240 of the VSAT ODU 125. Such interconnectivity between the VSAT IDU 120 and the VSAT ODU 125 helps to facilitate smooth conversion of user network data into a modulatable format for the VSAT ODU 125 in the transmit direction and to translate satellite signals back into digital data comprehensible to other network systems of the customer premises in the receive direction. The power supply unit 220 can generate (e.g., produce, convert, etc.) and provide power to the VSAT IDU 120 components. In some implementations, the power supply unit 220 also provides power to the VSAT ODU 125 components. For example, the interconnect 230 between the VSAT IDU 120 and the VSAT ODU 125 can include both data and power signals. The user interface 215 can include any feasible interface components (e.g., touchscreens, displays, buttons, switches, microphones, light sensors, proximity sensors, etc.) to facilitate user interface with the VSAT IDU 120.

As illustrated, embodiments herein assume that the VSAT IDU 120 includes a WiFi router 115. The WiFi router 115 is illustrated as coupled with the digital interface 210. Alternatively, the WiFi router 115 can be coupled with other components, such as with the embedded computer 240 and/or modem 250 of the VSAT ODU 125. The WiFi router 115 effectively extends the services of the satellite communication network to a WLAN 117 that can be accessed by UEs in wireless range (e.g., in the customer premises). Though not explicitly shown, the WiFi router 115 can include one or more antennas and radio transceivers for broadcasting and receiving Wi-Fi signals over one or more WiFi frequency bands. Typically, WiFi routers 115 operate in the 2.4 GHz frequency band (e.g., 2402 MHz-2482 MHz) and/or the 5 GHz frequency band (e.g., 5150 MHz-5895 MHz). Some WiFi routers 115 can operate in other frequency bands, such as 6 GHz (referred to as Wi-Fi 6E). The WiFi routers 115 support related IEEE 802.11 standards, such as 802.11b/g/n for the 2.4 GHz band and 802.11a/n/ac/ax for the 2.4 GHz and 5 GHz bands. Embodiments can also include one or more processors, memory (e.g., non-transitory processor readable memory, random access memory, flash storage, etc.), ports (e.g., Ethernet LAN ports), firmware, etc.

As described above, one or more customer RF transceiver devices, such as a cellular booster, can be disposed in a same customer premises as the VSAT 200. Often, these devices are placed in close proximity to each other within the customer premises. For example, there may be a particular location within a customer's home (e.g., a home office) that is well-suited for locating routers, boosters, electronic appliances, and the like. However, particularly when placed in close proximity, such RF transceiver devices can potentially produce RF interference with the WiFi router 115, which can degrade performance.

Although FIG. 1 shows a cellular booster 130 as an example of such an RF transceiver device, many other types of devices can be similarly problematic. Some examples include bluetooth devices (e.g., headsets, speakers, keyboards, mice, and fitness trackers, etc.), other wireless devices (e.g., video cameras, baby monitors, gaming controllers, etc.), femtocells, WiFi repeaters (e.g., mesh devices), smart home appliances, microwave ovens, cordless phones, and other WiFi routers and/or access points. Each of these types of devices can (at least in some implementations) operate in or near the 2.4 GHz frequency band and/or the 5 GHz frequency band. Other devices, even if not operating in WiFi frequency bands, can still potentially cause interference. For example, cellular boosters operate in cellular bands, such as 700 MHz, 800 MHz (Band 20), 900 MHz (E-GSM), 1800 MHz (DCS), 1900 MHz (PCS), 2.1 GHz (Band 1), 2.6 GHz (Band 7), and millimeter wave bands (e.g., 24 GHz and up).

Typically, interference between devices transmitting signals in different frequency bands (e.g., a cellular signal at 2.1 GHz and a Wi-Fi signal at 2.4 GHz) is unlikely, especially when the devices are properly designed to meet power and electromagnetic specifications, regulations, design constraints, etc. However, under certain conditions, RF transceiver devices can interfere with a collocated WiFi router 115 based on several mechanisms, even when designed to operate in different frequency bands. One mechanism for such interference is harmonic interference. For example, even though the primary (fundamental) operating frequencies of the devices are in separated bands, harmonics (i.e., multiples of the frequency) may overlap. Another mechanism for such interference is due to spurious emissions and broadband noise. Any electronic devices can generate spurious emissions, and RF transceiver devices can generate such spurious emissions outside their primary operating bands or can otherwise contribute to the broadband noise floor. For example, spurious emissions can result from poor RF design, poor filtering, malfunctioning or aging components, etc. Notably, even low-level spurious emissions can cause interference if they happen to be at an overlapping frequency. Another mechanism is intermodulation, which can occur when two or more signals mix in a non-linear device (e.g., amplifiers or corroded connections), thereby creating additional signals at frequencies that are not present in the original signals. For example, signals from multiple RF transceiver devices can potentially intermodulate to produce an interfering signal that neither would produce alone. Another mechanism is receiver overload by which a very strong signal from a nearby transmitter, even if on a different frequency, can overload a receiver's front-end and cause it to be less sensitive to its intended signal. Essentially, transmission energy from an RF transceiver device near the WiFi router 115 can potentially swamp the circuitry of the WiFi router's 115 receiver, thereby drowning out the signals it is intending to receive.

Embodiments described herein seek to detect when WiFi channels experience channel quality degradation due to interference from nearby RF transceiver devices and to automatically remap WiFi receivers to different WiFi channels for improved performance. The WiFi router 115 can communicate via multiple non-overlapping channels in one or more WiFi frequency bands. As one example, the WiFi router 115 communicates on any (one or more of) 11 channels in the 2.4 GHz band. When one of the channels is being used to communicate with one or more WiFi-capable UEs, the channel is referred to as an "active" channel. Otherwise, the channels are referred to as "idle." When embodiments detect channel quality degradation on a presently active channel, embodiments scan for at least one improved channel that is one of the presently idle channels determined presently to have better channel quality. Embodiments automatically coordinate moving any impacted WiFi-capable UEs from the degraded channel to the improved channel.

Figure 3A:
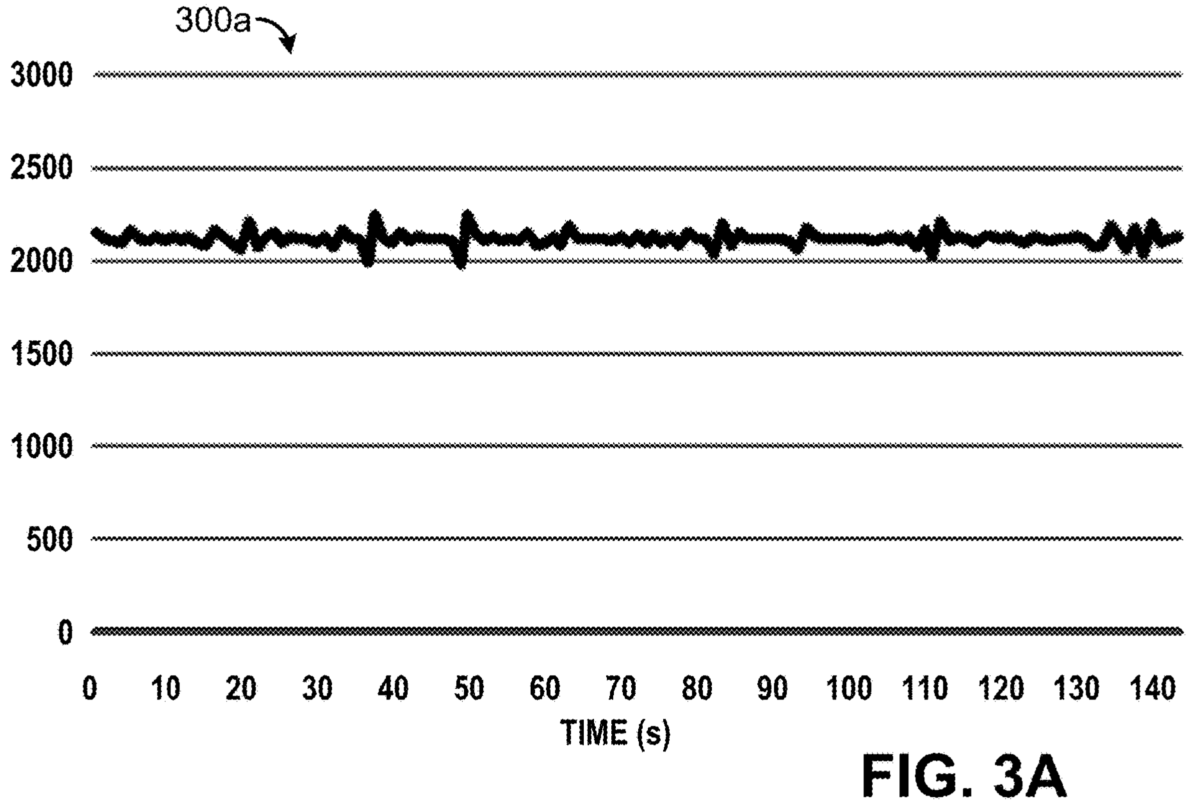
FIGS. 3A and 3B show plots of numbers of received packets versus time in an environment with no interfering RF transceiver device and an environment with an interfering RF transceiver device (e.g., a closely proximate cellular booster), respectively.
Figure 3B:
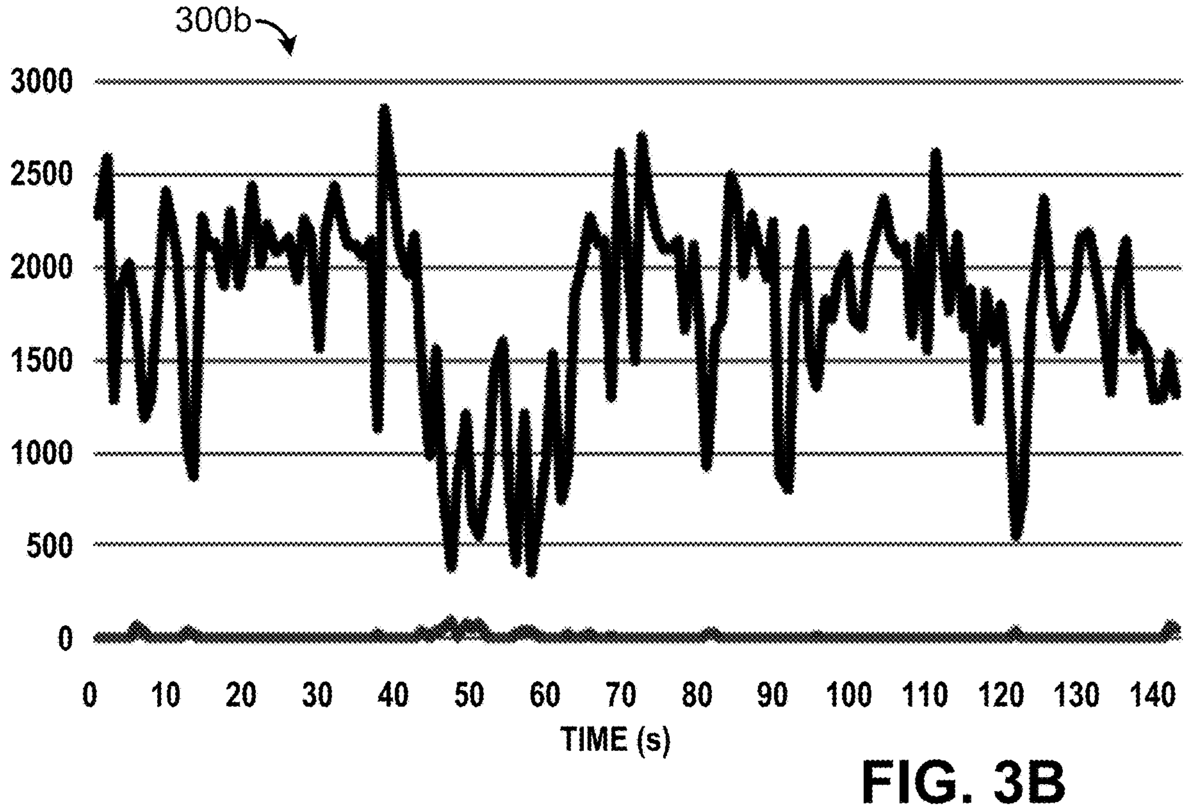

FIGS. 3A-4B show several plots that illustrate different effects of interference on different channels in different frequency bands. FIGS. 3A and 3B show plots 300 of numbers of received packets versus time in an environment with no interfering RF transceiver device and an environment with an interfering RF transceiver device (e.g., a closely proximate cellular booster), respectively. The plots 300 represent one example of data recorded from one experimental setup; it is expected that the data will look different at different times, under different interference conditions, etc. In the plot 300*a* of FIG. 3A, it can be seen that a fairly consistent number of packets (around 2100) is received at each time when no interfering RF transceiver device is present. In contrast, the plot 300*b* of FIG. 3B shows a widely varying number of packets being received at each time in presence of an interfering RF transceiver device. Although there are particular times when a higher number of packets is received in FIG. 3B than in FIG. 3A, it can be seen that the mean number of packets over time in FIG. 3B is degraded and the link is less reliable.

Figure 4A:
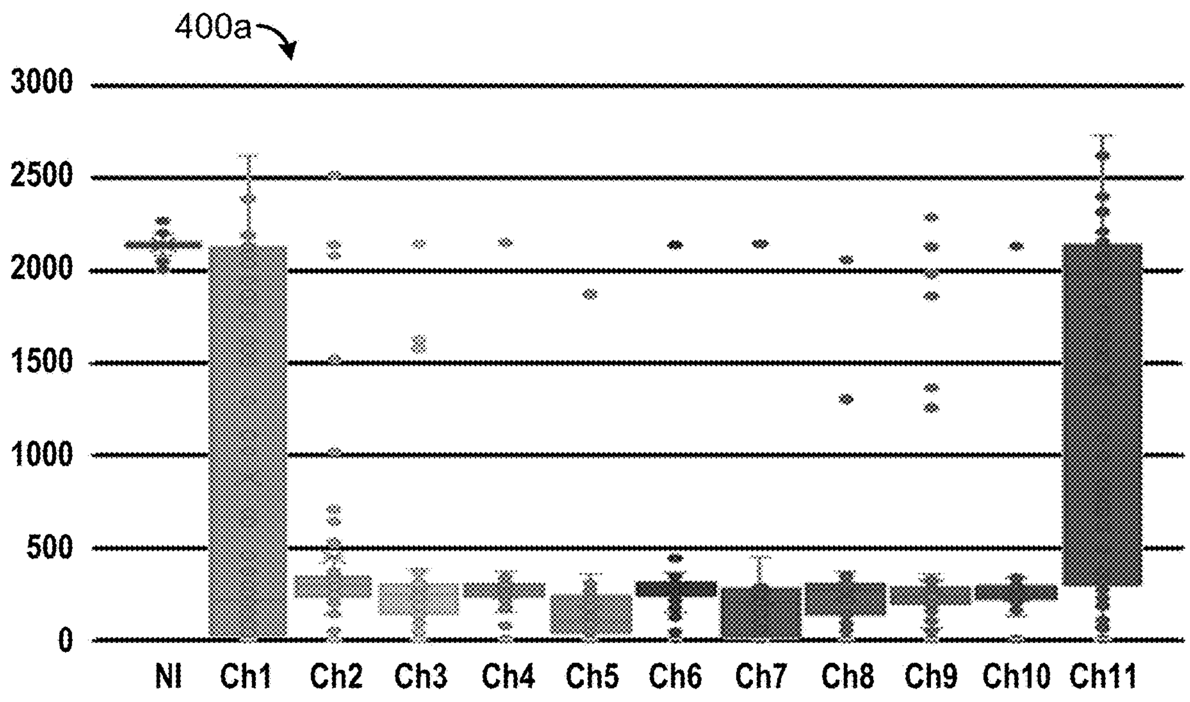
FIGS. 4A and 4B show box plot diagrams of numbers of packets received over time for different non-overlapping channels in the 2.4 GHz band and the 5 GHz band, respectively.
Figure 4B:
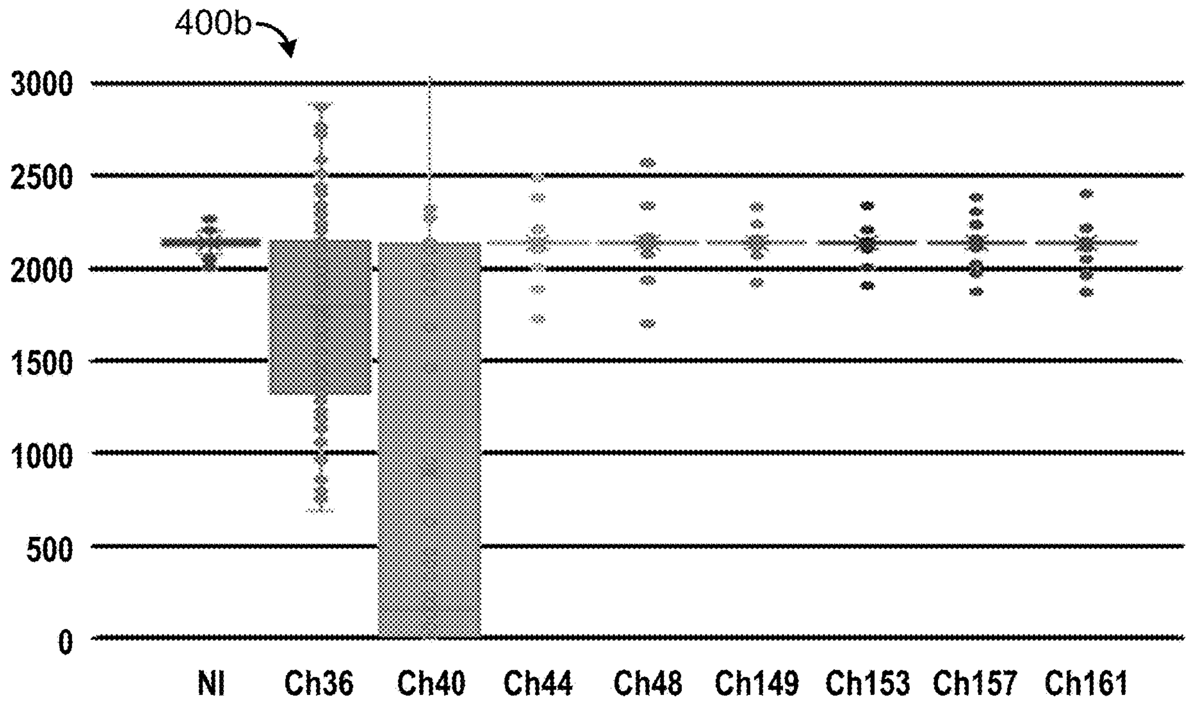

FIGS. 4A and 4B show box plot diagrams 400 of numbers of packets received over time for different non-overlapping channels in the 2.4 GHz band and the 5 GHz band, respectively. The plots 400 represent one example of data recorded from one experimental setup; it is expected that the data will look different at different times, under different interference conditions, etc. Each diagram 400 includes a box plot to represent the case where there is no interfering RF transceiver device (labeled "NI"). Consistent with the plots 300 of FIGS. 3A and 3B, each NI box plot indicates a relatively consistent (i.e., low standard deviation) received number of packets per second (e.g., around 2100).

The plot 400*a* of FIG. 4A assumes that 11 non-overlapping channels are used in the 2.4 GHz band. The plot 400*a* shows that, in the presence of interference, all 11 channels experience degraded performance. In particular, each channel sees a reduced median number of received packets per second and an increased standard deviation. The plot 400*a* also shows that, although all channels have degraded quality, they are degraded differently. For example, channels 2-10 may be considered more degraded than channels 1 and 11. The plot 400*b* of FIG. 4B assumes that 8 non-overlapping channels are used in the 5 GHz band. The plot 400*a* shows that, in the presence of interference, 2 of the 8 channels experience degraded performance, and the other 6 channels are relatively unaffected.

Figure 5:
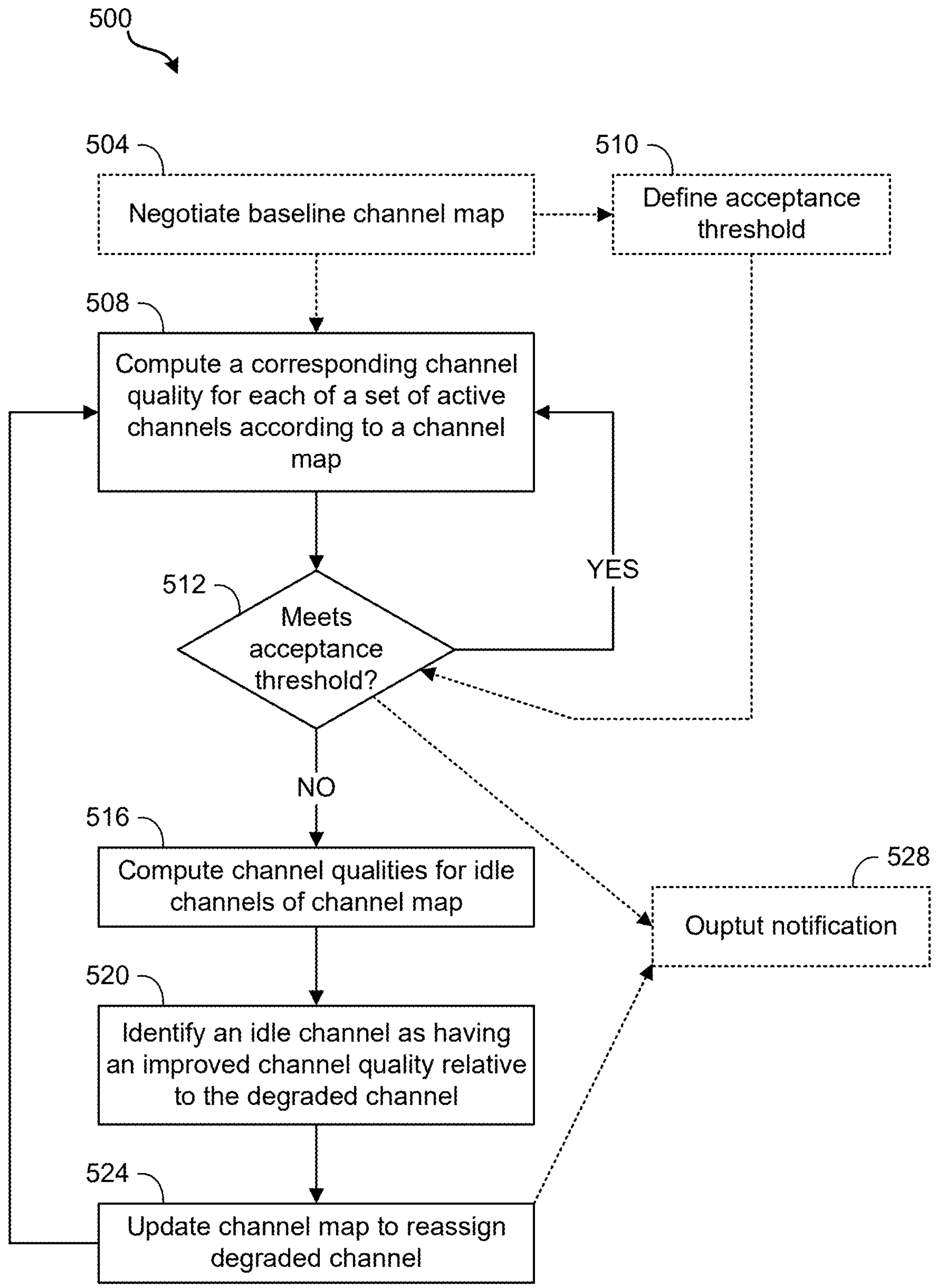
FIG. 5 shows a flow diagram of an illustrative method for automatic frequency hopping in a WiFi router, according to embodiments described herein.

FIG. 5 shows a flow diagram of an illustrative method 500 for automatic frequency hopping in a WiFi router, according to embodiments described herein. Embodiments of the method 500 can be implemented by one or more processors of a WiFi router that is implemented within a VSAT IDU in communication with a satellite communication system. Some embodiments begin at stage 508 by first computing a corresponding channel quality for each of a set of active channels. As used herein, the term "set" means one or more. For example, the "set of active channels" means one or more active channels. Each of the set of active channels is one of multiple channels of the WiFi router having a corresponding set of user equipment (UE) devices (also referred to herein simply as UEs) presently assigned, based on a channel map, to communicate therewith. As used herein, any channel presently assigned for communication with UE devices (e.g., any channel that is presently an active part of the WLAN) is referred to as an "active" channel, and other (unused) channels are referred to as "idle" channels.

For example, as described herein, UE devices are disposed in a customer premises, and at least some are WiFI-capable, so that they can communicatively couple with a WiFi-enabled WLAN facilitated by the WiFi router. The WiFi router supports some number of non-overlapping channels, each corresponding to a non-overlapping sub-band of one or more operating frequency bands of the WiFi router (e.g., 2.4 GHz and/or 5 GHz). Each UE device is assigned to communicates on the WLAN via one of the channels according to a channel map. As such, the channel map defines a correspondence between each channel and a corresponding set (i.e., a disjoint subset) of the UEs.

Some embodiments of the method 500 begin before stage 508, at stage 504, by negotiating the initial channel map between the WiFi router and the UE devices. For example, as part of a start-up sequence for the WiFi router (e.g., and/or during restart, initial setup, detection of a new UE device on the network, etc.), the WiFi router negotiates or renegotiates the channel map. In some implementations, the channel map is negotiated so that the WiFi router communicates with all connected UE devices on a same single channel at any given time. For example, the WiFi router is tuned to a specific channel, and all communication (e.g., whether to a single UE device or to multiple UE devices) occurs over this channel. In other implementations, a single WiFi router can concurrently support multiple channels, each communicating with its corresponding set of UE devices. For example, each channel can be associated with an access point (AP), and each AP effectively communicates with all its connected UE devices on its corresponding single channel.

Negotiation of the channel map can be performed at any suitable time. For example, a Wi-Fi router can negotiate its channel mapping primarily during an initial setup and, subsequently, it can adjust the channel mapping based on the surrounding Wi-Fi environment to maintain optimal performance, including in the manner described herein. For example, when powered on, the WiFi router can scan the WiFi spectrum for available channels, analyzing the congestion and interference levels on the different channels. In embodiments that support multiple bands (e.g., both 2.4 GHz and 5 GHz bands), the WiFi router may select the best channels for mapping within each band. Based on the scan, the WiFi router can select the channel or channels with the best channel quality. For example, better channel quality can correspond to higher receive power, lower interference, lower congestion, etc. Some embodiments permit manual channel mapping, such as via a user interface. Performance of stage 504 can occur during an initial setup of the WiFi router, whenever the WiFi router is powered on or restarter, periodically (e.g., according to a schedule and/or timer), on demand (e.g., based on manual user triggering), and/or at any feasible time.

Returning to stage 508, the computing of channel quality can be performed in several ways. Each type of computation effectively yields an estimate of present quality in relation to one or more channel parameters. In some embodiments, the channel quality computation is based on measuring received signal strength indicators (RSSIs) for the channels. RSSI is a measure of the power level that a receiver detects from the signal being received (i.e., receive power level). Such a measure can be relatively crude and can vary between devices, but it can still provide a sufficiently useful indication of signal strength and channel quality. Typically, each UE device monitors its own RSSI and reports a corresponding value back to the transmitter (WiFi router). In some embodiments, the channel quality computation is based on measuring link quality metrics, such as a composite measure including signal strength, noise levels, error rates, etc. In some embodiments, the channel quality computation is based on measuring and analyzing channel state information (CSI), which provides detailed information about the channel properties between the WiFi router and UE device. For example, CSI indicates how a signal propagates and fades over different transmitter-receiver paths, which can be analyzed to estimate channel quality. Different implementations can use any suitable implicit and/or explicit channel quality information. For example, certain 802.11 protocols provide for explicit feedback mechanisms for use in estimating receive power and/or other channel quality indications.

At stage 512, embodiments determine presence of channel degrading interference from one or more radiofrequency transceiver devices proximate to the WiFi router at stage 508. The detecting can be based on the computing at stage 508 and can involve determining whether the corresponding channel quality for any active channel fails to meet a predefined acceptance threshold. In some embodiments, at stage 510, prior to stage 512, the method 500 includes defining the acceptance threshold. In some embodiments, the acceptance threshold is defined based on computing initial channel qualities of the plurality of channels of the WiFi router. For example, the acceptance threshold is defined based on a mean of initial channel qualities of the plurality of channels of the WiFi router. The initial channel qualities and/or the mean thereof can be computed concurrently with (e.g., as part of) initial negotiation of the channel map at stage 504.

If all active channels are determined at stage 512 to have an acceptable channel quality (i.e., to meet the predefined acceptance threshold), the method 500 can either end or can return to stage 508 to subsequently re-compute channel qualities (e.g., periodically). In some cases, stage 512 results in detecting presence of channel degrading interference from one or more radiofrequency transceiver devices proximate to the WiFi router causing at least one active channel of the set of active channels to be a degraded channel (i.e., the active channel is determined to have a corresponding channel quality that fails to meet the predefined acceptance threshold.

At stage 516, embodiments can compute a corresponding candidate channel quality for the idle channels. In some implementations, this can involve computing channel qualities only for the idle channels. In some implementations, this can further involve computing and/or re-computing for some or all of the active channels. At stage 520, embodiments can identify, based on the computing at stage 516, one of the set of idle channels as having an improved channel quality relative to the degraded channel.

The computation at stage 516 (e.g., and/or the identification at stage 520) can be performed using techniques described in the context of stage 508 and 512. Many techniques for measuring channel quality rely on feedback from receivers, such that those techniques cannot be used to measure channel quality for idle channels. Some embodiments perform the computation at stage 516 by temporarily reassigning a selected one or more of the UE devices to idle channels, so that those channels become active for long enough to obtain a channel quality measurement. The temporary reassignment can be performed in any feasible manner. For example, embodiments can select UE devices and/or select idle channels for reassignment based on random selection techniques, round-robin selection techniques, etc.

At stage 524, embodiments can update the channel map, based on the identifying at stage 520. The updating at stage 524 can include re-assigning the set of UE devices that corresponds to the degraded channel from the degraded channel to the one of the set of idle channels identified as having the improved channel quality. For example, referring to FIG. 4B, at a time corresponding to performance of stage 508, channel 40 is an active channel (e.g., several UE devices may be communicating on channel 40), and channel 44 is an idle channel. Stages 508 and 512 result in a determination that active channel 40 is a degraded channel, and stages 516 and 520 result in an identification of idle channel 44 as having better channel quality than that of active channel 40. Accordingly, at stage 524, embodiments can update the channel map so that any UE devices communicating on channel 40 are now reassigned to channel 44. As such, channel 44 becomes an active channel, and channel 40 becomes an idle channel.

Updating of the channel map at stage 524 can be performed in several ways. In some implementations, the UE devices on a degraded channel are remapped to whatever is determined to have the best present channel quality. In other implementations, the UE devices on a degraded channel are remapped to any idle channel determined to have better present channel quality than that of the degraded channel. In one implementation, if there are multiple degraded channels, the order of remapping is random. In one implementation, if there are multiple degraded channels, the order of remapping is based on whichever active channel is supporting the largest number of UE devices. In one implementation, if there are multiple degraded channels, the order of remapping is based on whichever active channel is presently seeing the most traffic. Some implementations update the channel map at stage 524 based on additional factors. In one such implementation, the updating further accounts for load balancing.

In some implementations, channel mapping and remapping events (e.g., connected with stages 504 and 524) can be recorded and used to improve future iterations of stages 504 and/or 524. Embodiments include a machine learning network (e.g., a neural network) to monitor which channels tend to behave in which ways over time. For example, particular channels may be found to be more likely to degrade in presence of the types of interference caused by other RF transceiver devices in the customer premises, and/or particular channels may be found to be more likely to result in improved channel quality when switched to, etc. The machine learning network can improve its efficiency over time, accordingly, by learning which are the best channels to assign, reassign, etc.

In some embodiments, at stage 528, the method 500 can generate one or more notifications to indicate the detected presence of channel degrading interference at stage 512 and/or the automatic remapping of channels at stage 524. In some implementations, generating the notification involves outputting the notification via a user interface element of the WiFi router (e.g., of the VSAT terminal), such as by illuminating an indicator light, sounding an audible alert, displaying a textual and/or graphical notification on a display, etc. In some implementations, generating the notification involves outputting a notification message to one or more UE devices, such as one of the UE devices in communication with the WLAN. In some implementations, the notification can generally indicate the presence of channel degradation. IN other implementations, the notification can more specifically indicate the detected presence of channel degrading interference.

Figure 6:
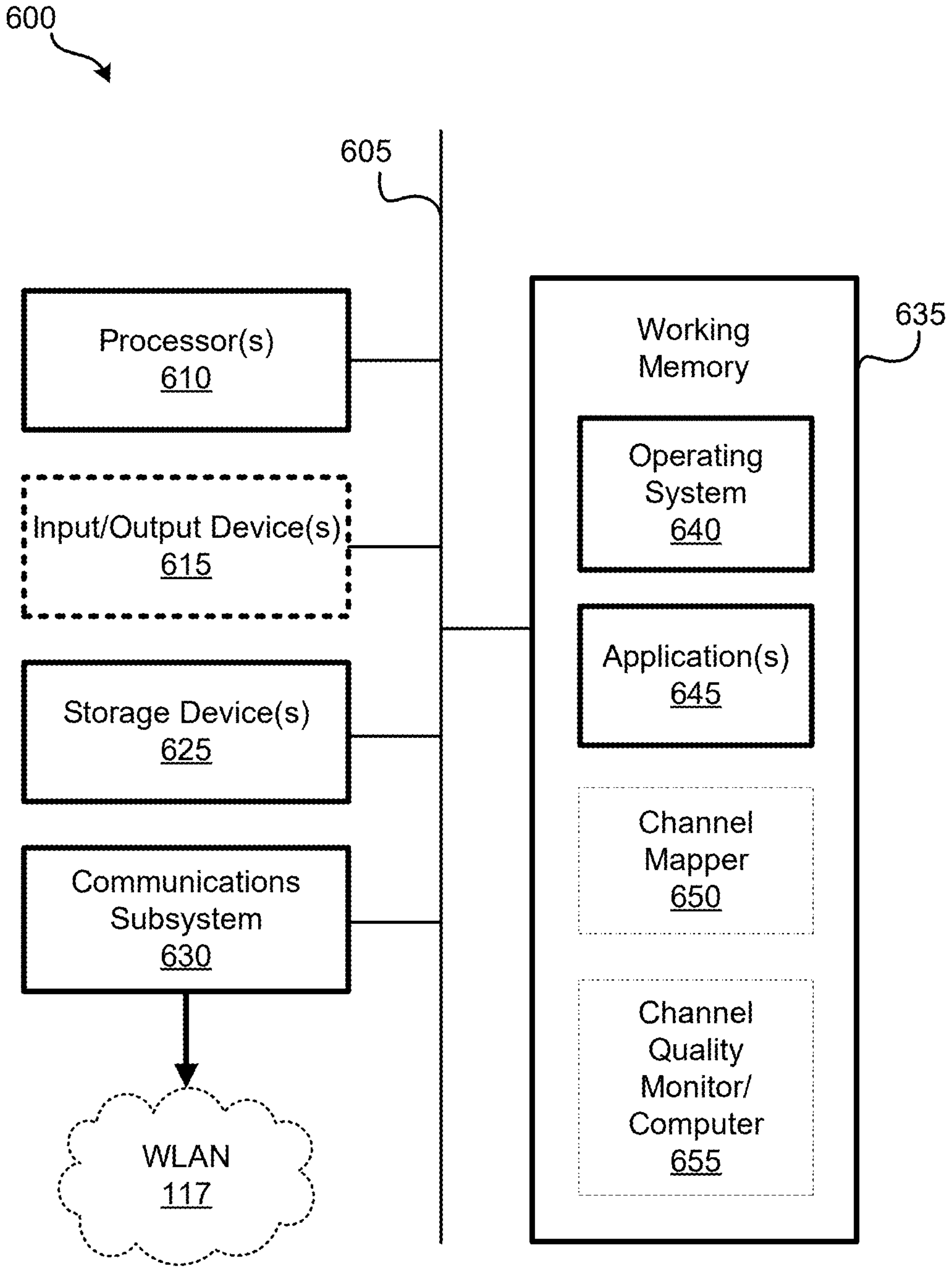
FIG. 6 provides a schematic illustration of an embodiment of a computational system that can implement various system components and/or perform various steps of methods provided by various embodiments.

In some embodiments, components of the WiFi router (e.g., and/or the VSAT IDU and/or ODU) are implemented in a computational environment. FIG. 6 provides a schematic illustration of an embodiment of a computational system 600 that can implement various system components and/or perform various steps of methods provided by various embodiments. The computational system 600 represents an illustrative implementation of a WiFi router having intelligent beam hopping features described herein. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computational system 600 is shown including hardware elements that can be electrically coupled via a bus 605 (or may otherwise be in communication, as appropriate). The hardware elements may include one or more processors 610, including, without limitation, a set of (i.e., one or more) general-purpose processors and/or special-purpose processors (such as digital signal processing chips, graphics acceleration processors, video decoders, and/or the like). As described herein, the WiFi router is integrated in a VSAT. In some implementations, one or more of the processor(s) 610 are processor(s) of the VSAT that can also be utilized by the WiFi router.

Optionally, embodiments of the computational system 600 can include one or more input/output (I/O) devices 615. The I/O devices 615 can include user input devices (e.g., a mouse, a keyboard, remote control, touchscreen interfaces, audio interfaces, video interfaces, and/or the like), machine input devices (e.g., computer-to-computer interfaces, such as wired and/or wireless input data ports), user output devices (e.g., display devices, printers, and/or the like), and/or machine input devices (e.g., computer-to-computer interfaces, such as wired and/or wireless output data ports). In some implementations, some or all of the I/O devices 615 are I/O devices of the VSAT that can also be utilized by the WiFi router.

The computational system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random-access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 625 include memory for storing acceptance thresholds, channel maps, and/or other information used by embodiments to implement features described herein. In some implementations, some or all of the storage devices 625 are storage devices of the VSAT that can also be utilized by the WiFi router.

The computational system 600 can also include a communications subsystem 630, which includes at least WiFi components (e.g., a WiFi chipset) for enabling a WiFi-based WLAN 117 operating in one or more WiFi frequency bands. Some embodiments of the communications subsystem 630 can also include, without limitation, a modem, a network card (wireless or wired), an infrared communication device, a wireless communication device, and/or a chipset (such as a Bluetooth™ device, another 802.11 device, a WiMax device, cellular communication device, etc.), and/or the like. In some implementations, the communications subsystem 630 utilizes and/or includes one or more other components of the VSAT (e.g., modem features, etc.).

Embodiments of the computational system 600 can further include a working memory 635, which can include a RAM or ROM device, as described herein. The computational system 600 also can include software elements, shown as currently being located within the working memory 635, including an operating system 640, device drivers, executable libraries, and/or other code, such as one or more application programs 645, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general-purpose computer (or other device) to perform one or more operations in accordance with the described methods. In some implementations, the computational system 600 of the WiFi router can utilize and/or include one or more computational components (e.g., working memory, etc.) of the VSAT.

In some embodiments, the operating system 640 and the working memory 635 are used in conjunction with the one or more processors 610 to implement a channel mapper 650 and a channel quality monitor/computer 655. For example, embodiments of the channel mapper 650 are used to negotiate an initial channel map and subsequent channel maps, as described herein. The channel quality monitor/computer 655 can, at a suitable time, compute a corresponding channel quality for each of a set of active channels, wherein each of the set of active channels is one of several channels of the WiFi router having a corresponding set of UE devices presently assigned, based on the channel map, to communicate therewith, each corresponding set of UE devices being a disjoint subset of a plurality of UE devices in a customer premises. The channel quality monitor/computer 655 can detect presence of channel degrading interference from one or more radiofrequency transceiver devices proximate to the WiFi router causing an active channel of the set of active channels to be a degraded channel by determining that the corresponding channel quality of the active channel fails to meet a predefined acceptance threshold. The channel quality monitor/computer 655 can then compute a corresponding candidate channel quality for each of a set of idle channels of the plurality of channels of the WiFi router and can identify one of the set of idle channels as having an improved channel quality relative to the degraded channel. The channel mapper 650 can update the channel map, based on the identifying, by re-assigning the set of UE devices that corresponds to the degraded channel from the degraded channel to the one of the set of idle channels identified as having the improved channel quality. As described above, embodiments of the channel mapper 650 can implement a machine learning network (e.g., a neural network) to monitor which channels tend to behave in which ways over time and to improve its efficiency over time by learning which are the best channels to assign, reassign, etc.

A set of these instructions and/or codes can be stored on a non-transitory (or non-transient) computer-readable storage medium, such as the non-transitory storage device(s) 625 described above. In some cases, the storage medium can be incorporated within a computer system, such as computational system 600. In other embodiments, the storage medium can be separate from a computer system (e.g., a removable medium, such as a compact disc), and/or provided in an installation package, such that the storage medium can be used to program, configure, and/or adapt a general-purpose computer with the instructions/code stored thereon. These instructions can take the form of executable code, which is executable by the computational system 600 and/or can take the form of source and/or installable code, which, upon compilation and/or installation on the computational system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computational system 600) to perform methods in accordance with various embodiments of the invention. According to a set of embodiments, some or all of the procedures of such methods are performed by the computational system 600 in response to processor 610 executing one or more sequences of one or more instructions (which can be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 can cause the processor(s) 610 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computational system 600, various computer-readable media can be involved in providing instructions/code to processor(s) 610 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a disk of a remote computer. The remote computer can load the instructions into its dynamic memory and send the instructions as signals over a transmission medium to be received and/or executed by the computational system 600. The communications subsystem 630 (and/or components thereof) generally will receive signals, and the bus 605 then can carry the signals (and/or the data, instructions, etc., carried by the signals) to the working memory 635, from which the processor(s) 610 retrieves and executes the instructions. The instructions received by the working memory 635 may optionally be stored on a non-transitory storage device 625 either before or after execution by the processor(s) 610.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A very small aperture terminal (VSAT) comprising:
- a wireless fidelity (WiFi) router;
- a set of processors; and
- a non-transitory memory having, stored thereon, a channel map and instructions, wherein the instructions, when executed, cause the set of processors to perform steps comprising:
  - first computing a corresponding channel quality for each of a set of active channels, wherein each of the set of active channels is one of a plurality of channels of the WiFi router having a corresponding set of user equipment (UE) devices presently assigned, based on the channel map, to communicate therewith, each corresponding set of UE devices being a disjoint subset of a plurality of UE devices in a customer premises;
  - detecting, based on the first computing, presence of channel degrading interference from one or more radiofrequency transceiver devices proximate to the WiFi router causing an active channel of the set of active channels to be a degraded channel by determining that the corresponding channel quality of the active channel fails to meet a predefined acceptance threshold;
  - second computing a corresponding candidate channel quality for each of a set of idle channels of the plurality of channels of the WiFi router;
  - identifying, based on the second computing, one of the set of idle channels as having an improved channel quality relative to the degraded channel; and
  - updating the channel map, based on the identifying, by re-assigning the set of UE devices that corresponds to the degraded channel from the degraded channel to the one of the set of idle channels identified as having the improved channel quality.

2. The VSAT of claim 1, wherein the WiFi router comprises:
- a channel quality monitor/computer implemented by the set of processors, such that, when the instructions are executed, the channel quality monitor/computer performs:
  - the step of first computing the corresponding channel quality for each of the set of active channels;
  - the step of detecting the presence of the channel degrading interference;
  - the step of second computing the corresponding candidate channel quality for each of the set of idle channels; and
  - the step of identifying, based on the second computing, one of the set of idle channels as having an improved channel quality relative to the degraded channel; and
- a channel mapper implemented by the set of processors, such that, when the instructions are executed, the channel mapper performs the step of updating the channel map, based on the identifying, by re-assigning the set of UE devices that corresponds to the degraded channel from the degraded channel to the one of the set of idle channels identified as having the improved channel quality.

3. The VSAT of claim 1, wherein the steps further comprise, prior to the detecting:
- defining the acceptance threshold based on computing initial channel qualities of the plurality of channels of the WiFi router.

4. The VSAT of claim 3, wherein the acceptance threshold is defined based on a mean of the initial channel qualities of the plurality of channels of the WiFi router.

5. The VSAT of claim 1, wherein the steps further comprise, prior to the first computing:
- negotiating the channel map between the WiFi router and the plurality of UE devices as upon start-up the WiFi router.

6. The VSAT of claim 1, wherein the steps further comprise:
- outputting a notification, responsive to the detecting, indicating the presence of channel degrading interference from one or more radiofrequency transceiver devices proximate to the WiFi router.

7. The VSAT of claim 1, wherein the first computing the corresponding channel quality for each of a set of active channels comprises computing a corresponding receive power level for each of the set of active channels.

8. The VSAT of claim 1, wherein the second computing is responsive to the detecting.

9. The VSAT of claim 1, wherein the plurality of channels of the WiFi router are non-overlapping channels within at least one operating frequency band of the WiFi router.

10. The VSAT of claim 1, further comprising:
- a satellite transceiver coupled with the WiFi router and configured to communicate with a satellite communication network via a small-aperture satellite antenna.

11. The VSAT of claim 10, further comprising:

an indoor unit configured to be disposed inside a customer premises and comprising the WiFi router; and an outdoor unit configured to be disposed outside the customer premises and comprising the satellite transceiver and the small-aperture satellite antenna.

12. A method for automatic frequency hopping in a wireless fidelity (WiFi) router, the method comprising:

first computing a corresponding channel quality for each of a set of active channels, wherein each of the set of active channels is one of a plurality of channels of the WiFi router having a corresponding set of user equipment (UE) devices presently assigned, based on a channel map, to communicate therewith, each corresponding set of UE devices being a disjoint subset of a plurality of UE devices in a customer premises;

detecting, based on the first computing, presence of channel degrading interference from one or more radiofrequency transceiver devices proximate to the WiFi router causing an active channel of the set of active channels to be a degraded channel by determining that the corresponding channel quality of the active channel fails to meet a predefined acceptance threshold;

second computing a corresponding candidate channel quality for each of a set of idle channels of the plurality of channels of the WiFi router;

identifying, based on the second computing, one of the set of idle channels as having an improved channel quality relative to the degraded channel; and updating the channel map, based on the identifying, by re-assigning the set of UE devices that corresponds to the degraded channel from the degraded channel to the one of the set of idle channels identified as having the improved channel quality.

13. The method of claim 12, wherein:

the one or more radiofrequency transceiver devices includes a cellular booster proximate to the WiFi router and in communication with at least one terrestrial cellular communication network.

14. The method of claim 12, further comprising, prior to the detecting:

defining the acceptance threshold based on computing initial channel qualities of the plurality of channels of the WiFi router.

15. The method of claim 14, wherein the acceptance threshold is defined based on a mean of the initial channel qualities of the plurality of channels of the WiFi router.

16. The method of claim 12, further comprising, prior to the first computing:

negotiating the channel map between the WiFi router and the plurality of UE devices as upon start-up the WiFi router.

17. The method of claim 12, further comprising:

outputting a notification, responsive to the detecting, indicating the presence of channel degrading interference from one or more radiofrequency transceiver devices proximate to the WiFi router.

18. The method of claim 12, wherein the first computing the corresponding channel quality for each of a set of active channels comprises computing a corresponding receive power level for each of the set of active channels.

19. The method of claim 12, wherein the second computing is responsive to the detecting.

20. The method of claim 12, wherein the plurality of channels of the WiFi router are non-overlapping channels within at least one operating frequency band of the WiFi router.

* * * * *